UNITED STATES PATENT OFFICE.

FRANZ SCHOLL, OF HÖCHST-ON-THE-MAIN, GERMANY, ASSIGNOR TO THE FARBWERKE, VORMALS MEISTER, LUCIUS & BRÜNING, OF SAME PLACE.

GREEN-YELLOW DYE AND PROCESS OF MAKING SAME.

SPECIFICATION forming part of Letters Patent No. 658,593, dated September 25, 1900.

Application filed December 15, 1897. Serial No. 662,056. (Specimens.)

*To all whom it may concern:*

Be it known that I, FRANZ SCHOLL, doctor of philosophy, a citizen of the Empire of Germany, residing at Höchst-on-the-Main, Germany, have invented certain new and useful Improvements in the Manufacture of New Greenish-Yellow-Dyeing Dyestuffs, of which the following is a description.

This invention relates to the production of new greenish-yellow-dyeing dyestuffs.

It is known that when diazobenzene reacts upon ethyl aceto - acetate benzeneazoacetoacetate of ethyl is formed, (see Meyer, *Berichte*, 10, 2075,) and when it reacts upon malonic acid ester benzeneazomalonic acid is formed. (See Meyer, *Berichte*, 21, 118, 24, 1241.)

For the manufacture of dyestuffs the ability of aliphatic bodies to form with diazo compounds azo bodies has hitherto not been utilized. According to my experiments diazotized amido-sulfonic acids produce, as a rule, with the diketones azo compounds or hydrazones, which mostly, however, are deficient in tinctorial power and are consequently useless as dyestuffs. I have found that, on the contrary, very beautiful and useful greenish-yellow dyestuffs may be obtained if aliphatic beta-diketones (such derivatives of the simple beta-ketonaldehyd, $CH_3-CO-CH_2CO-H$, in which the aldehyd hydrogen is substituted by alkyl, alphyl, alkyloxy, or an anilid group) are brought into reaction with the diazo compounds of sulfonic acids of the thio bases obtained by melting of para-toluidin or xylidin with sulfur—that is to say, of dehydrothio-toluidin (xylidin) and the primulin bases. The dyestuffs are useful for wool in an acid-bath and for cotton in a neutral and alkaline bath. This manufacture does not differ from that generally used for azo dyestuffs. The diketones are, before combining, brought into solution with one molecule of caustic soda or are merely well mixed with the soda solution. Upon these solutions or suspensions of the diketones are allowed to act the diazo compounds of the sulfonic acids of dehydrothiotoluidin (xylidin) or primulin. The same dyestuffs may be obtained by allowing the diazo compounds of the bases dehydrothiotoluidin (xylidin) or primulin to act upon beta-diketones and then by sulfonating the products insoluble in water thus produced. I proceed, for instance, as follows:

First. Sixty kilograms of primulin sulfonate of sodium are diazotized in the usual way. The suspended diazo compound is run, with stirring, into a solution of thirteen kilograms ethyl aceto - acetate in twelve kilograms caustic soda of 40° Baumé and five hundred kilograms of water, to which is added as much soda or sodium acetate as is requisite for the neutralization of the excess of hydrochloric acid and for the formation of the sodium salt. The dyestuff formed separates partly. After stirring for a short time the whole is heated and salted out.

Second. Twenty-four kilograms of dehydrothiotoluidin are diazotized and combined with fifteen kilograms of ethylacetoacetate in a soda alkaline solution. A light-yellow completely-insoluble body is precipitated. It is filtered off and well washed. For the sulfonation fifty kilograms of the well-dried product are introduced into two hundred kilograms of fuming sulfuric acid of five per cent. ($SO_3$.) On gently heating up to 30° to 40° centigrade the melt after cooling down is poured on ice and salted out with common salt. The filtered-off dye-acid is converted into the sodium salt by dissolving with soda. The dyestuff obtained possesses the same properties as that produced by combining diazotizable dehydrothiotoluidinmonosulfonic acid and ethyl aceto-acetate.

Having now described my invention, what I claim is—

1. The herein-described process of making new greenish-yellow-dyeing dyestuffs, which consists in sulfonating the thio bases obtained by the melting of sulfur with para-toluidin or xylidin and diazotizing the sulfonic acids thus obtained and bringing them into reaction with molecular quantities of aliphatic beta-diketones derived from $CH_3-CO-CH_2.COX$ (X=alphyl, alkyl, alkyloxy and anilid), substantially as set forth.

2. The new dyestuffs derived from diazotized primulinsulfonic acid and beta-diketones, being yellow powders, easily soluble in water with a pure-yellow but not very intense color, the color of the aqueous solution being not changed by an addition of soda or mineral acids, but becoming darker on addition of strong caustic alkali, said dyestuffs dissolving in concentrated sulfuric acid with the same color as in water but with a more vivid hue, and dyeing wool yellow in an acid and cotton in a neutral or alkaline solution, substantially as set forth.

3. The new dyestuffs derived from diazotized primulinsulfonic acid and ethyl acetoacetate, being yellow powders, easily soluble in water with a pure-yellow but not very intense color, the color of the aqueous solution being not altered on addition of soda or mineral acids, getting darker on addition of strong caustic alkali, dissolving in concentrated sulfuric acid with the same color as in water but with a more vivid hue, and without changing color when heated, said dyestuffs dyeing both wool in an acid and cotton in a neutral or alkaline solution yellow with a strong greenish tint, substantially as set forth.

In testimony that I claim the foregoing as my invention I have signed my name in presence of two subscribing witnesses.

FRANZ SCHOLL.

Witnesses:
HEINRICH HAHN,
ALFRED BRISBOIS.